(No Model.)

F. C. MERRILL.
HARROW.

No. 555,784. Patented Mar. 3, 1896.

Witnesses.
A. C. Perry.
M. B. Bullard.

Inventor.
Freeman C. Merrill
by W. E. Bird
Attorney.

UNITED STATES PATENT OFFICE.

FREEMAN C. MERRILL, OF PARIS, MAINE.

HARROW.

SPECIFICATION forming part of Letters Patent No. 555,784, dated March 3, 1896.

Application filed February 21, 1895. Serial No. 539,313. (No model.)

*To all whom it may concern:*

Be it known that I, FREEMAN C. MERRILL, a citizen of the United States, residing at Paris, in the county of Oxford and State of Maine, have invented certain new and useful Improvements in Harrows; and I do hereby declare that the following is a full, clear, and exact description of the invention, which will enable others skilled in the art to which it appertains to make and use the same.

My invention relates to harrows, and while the description and drawings refer to a class of harrows known as "spring-tooth" harrows the invention is not confined to any particular class of harrows, but may be applied to harrows with other forms of teeth.

My invention consists in a device whereby the depth to which the teeth enter the earth can be adjusted and at the same time the harrow readily turned in any desired direction and the driver of the team by which the harrow is drawn ride to and from the field and also while the harrow is in use. This is accomplished by the use of wheels pivoted to the frame and capable of vertical adjustment and also by so attaching the front wheel or wheels that they are constantly in line with the team.

Figure 1:
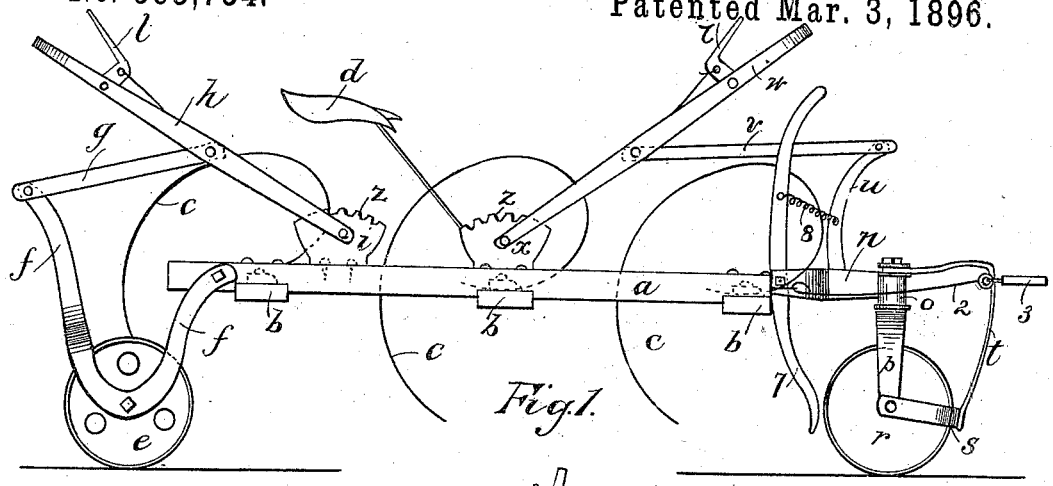
Figure 2:
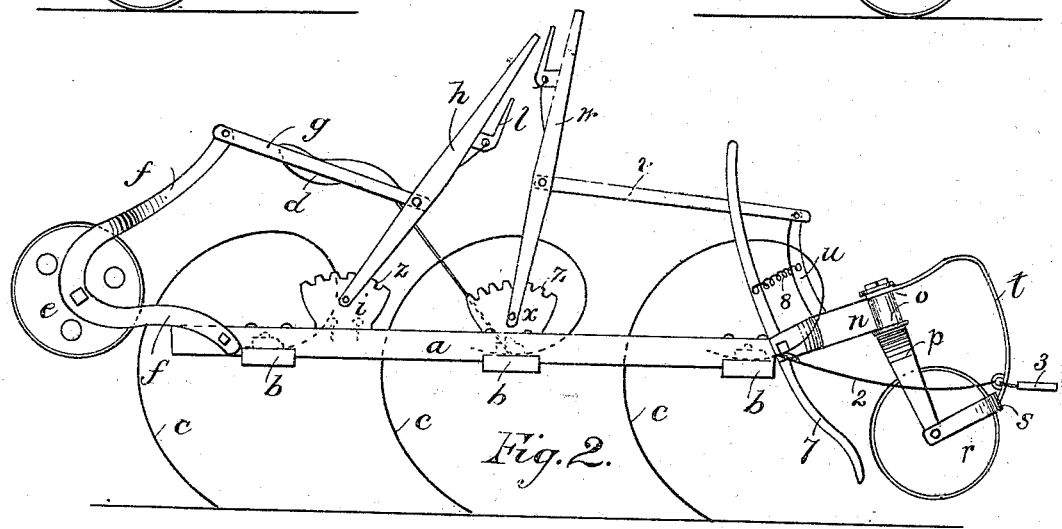
Figure 3:
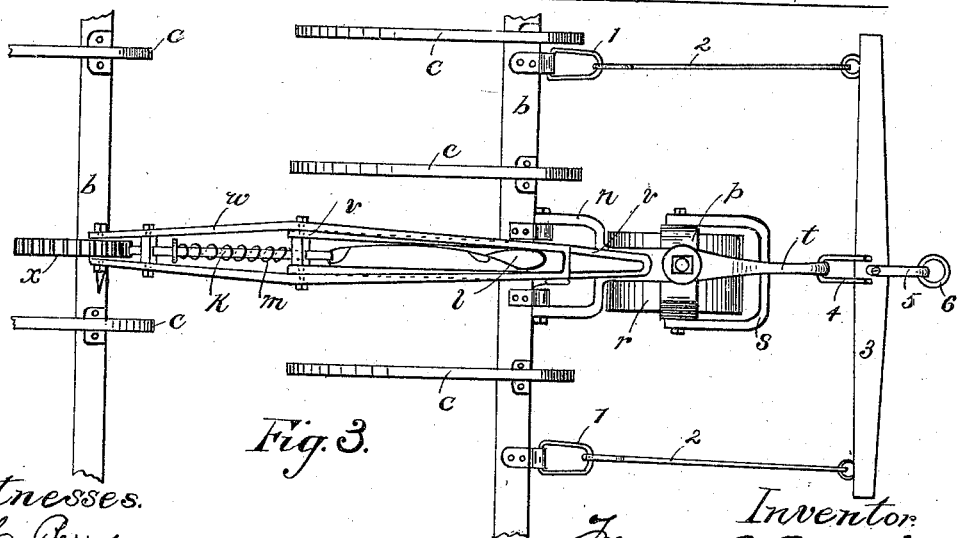

In the drawings, Figure 1 is a side elevation with my improvement attached. Fig. 2 is a similar view showing the wheels raised or partly raised. Fig. 3 is a top plan of a portion of the harrow-frame, showing the front wheel and the device whereby it is deflected from one side to the other.

$a\ a$ represent the side bars and $b\ b$ the cross-bars of the frame, upon the latter of which there are secured in a convenient manner the teeth $c\ c$. $d$ is the seat for the driver, which is attached to one of the cross-bars in the ordinary manner. Pivoted to the rear ends of said side bars $a\ a$ are bifurcated U-shaped hangers or carriers $f\ f$, the bifurcations embracing the end of the side bar to which they are pivoted. Within the bifurcations and at the lower part of the loop or curve are journaled the wheels of equal diameter $e\ e$. At the upper and other end of the hangers $f\ f$ is pivoted the arm $g$, the other end of which is pivoted to the lever $h$, the lower end of which in turn is pivoted to the plate $i$. The plate $i$ is secured to the side bar $a$ and is provided at the upper end with teeth $z$, adapted to receive the rod $k$ within the lever $h$. The lever $h$ is of the ordinary construction of such levers, being provided with a handpiece $l$, pivoted thereto, which is connected by a wire or flexible rod to the rod $k$, a coil-spring $m$ depressing the rod $k$ against the teeth or ratchet of the piece $i$. The forward wheel is placed as near as may be done at the center of the cross-bar $b$. At the front of this bar is placed the bifurcated piece $n$, each end of the bifurcations being secured to the bar in such manner as to permit motion of the piece $n$ in a vertical direction. The forward end of the piece $n$ terminates in a circular socket $o$, which receives the circular end of the bifurcated piece $p$. Within the bifurcations of the piece $p$ is journaled the forward wheel $r$. Bolted to the axle upon which the wheel $r$ turns is a yoke $s$, which extends around the front of the wheel, as shown in Fig. 3. Extending upward from the yoke $s$ is a guiding-loop $t$, the upper end of which is secured to the head of the bifurcated piece $p$ by the same bolt which holds it within the socket $o$. Rigidly attached to the bifurcated piece $n$ is the arm $u$, the upper end of which is connected by a rod $v$ to the lever $w$, the lower end of which is pivoted to the piece $x$ (secured to the cross-bars near the seat) of similar construction with the piece $i$ and having at the upper edge teeth $z$. The lever $w$ is of the same construction as the lever $l$ already described. Attached to the forward cross-bar $b$, upon either side of the wheel $r$ and equidistant therefrom, are links 1 1, within which are held the hooked ends of the rods 2 2, the forward ends of which are connected with rings or bolts upon the evener 3. At the center of the evener 3 is a link 4, which surrounds the guiding-loop $t$, as shown in Fig. 4. The evener is also provided at the center and upon its front with a link 5 having a ring within. Between the bifurcations of the piece $n$ and pivoted also to the front cross-bar $b$ is the brake 7, the upper part of which is connected by means of a coil-spring 8 with the arm $u$, as shown in Figs. 1 and 2.

In operation, assuming the harrow is starting from the shed to the field, the levers $h\ h$ and $w$ are depressed, as shown in Fig. 1, carrying the wheels $e\ e$ and $r$ to their lowest points, thus raising the frame of the harrow together with the teeth completely from all contact with the ground. The driver then mounts the seat $d$ and rides to the field as if upon a wagon, the harrow turning from right to left with the same facility as with the latter, as hereinafter explained. When the field is reached where the harrow is to be used, the the driver raises the levers $h\ h$ and $w$ so that the teeth will enter the ground to the required distance. It will be perceived that the position of the wheels may be so adjusted that the teeth may enter the ground but an inch or to such extent that the frame of the harrow is practically in contact with the surface of the ground. This adjustment may be made at any time by the driver, and he is able to ride while the work of the harrow is being performed.

Turning the harrow from side to side either upon the road or at work in the field may be accomplished by means of the device shown in Fig. 3—that is, by the forward wheel $r$ and the evener 3 and attachments. As the team is turned either from the right or left, the evener is thrown in like direction, carrying by reason of the connection of the loop 4 with the guiding-loop $t$ the wheel $r$, the piece $p$ turning readily in the socket $o$. The brake is applied to the wheel in the ordinary manner when its use is required.

What I claim is—

In combination with a harrow-frame two or more wheels attached to the rear of the frame, said wheels being vertically adjustable, a wheel attached to the front thereof by means of a vertically-adjustable frame or carrier, said frame having a forwardly-projecting guiding-loop and an evener loosely connected with said loop, said evener being connected by means of rods of equal length with the front of said harrow-frame, substantially as described.

In testimony that I claim the foregoing as my invention I have hereunto set my hand this 16th day of February, A. D. 1895.

FREEMAN C. MERRILL.

In presence of—
   GEO. E. BIRD,
   A. C. BERRY.